US009485200B2

(12) United States Patent
Munoz (10) Patent No.: US 9,485,200 B2
(45) Date of Patent: Nov. 1, 2016

(54) NETWORK SWITCH WITH EXTERNAL BUFFERING VIA LOOPAROUND PATH (71) Applicant: Intel Corporation, Santa Clara, CA (US)

(72) Inventor: Robert J. Munoz, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 950 days.

(21) Appl. No.: 13/746,080

(22) Filed: Jan. 21, 2013

(65) Prior Publication Data
US 2013/0128896 A1    May 23, 2013

Related U.S. Application Data (63) Continuation-in-part of application No. 12/782,379, filed on May 18, 2010, now Pat. No. 9,081,742, and a continuation-in-part of application No. 12/782,411, filed on May 18, 2010, now Pat. No. 8,407,707, and a continuation-in-part of application No. 13/705,822, filed on Dec. 5, 2012, and a continuation-in-part of application No. 12/782,393, filed on May 18, 2010, now Pat. No. 8,255,644.

(51) Int. Cl.
G06F 9/455      (2006.01)
G06F 9/46       (2006.01)
H04L 12/28      (2006.01)
H04L 12/861     (2013.01)
H04L 12/933     (2013.01)
H04L 12/931     (2013.01)
H04L 12/835     (2013.01)
H04L 12/833     (2013.01)
H04L 12/801     (2013.01)

(52) U.S. Cl.
CPC ........... H04L 49/9078 (2013.01); H04L 47/12 (2013.01); H04L 47/30 (2013.01); H04L 47/31 (2013.01); H04L 49/101 (2013.01); H04L 49/109 (2013.01); H04L 49/506 (2013.01)

(58) Field of Classification Search
CPC .................................................. H04L 49/9078
USPC ........................... 370/412–463; 709/212–235
See application file for complete search history.

(56) References Cited

U.S. PATENT DOCUMENTS 4,622,631 A   11/1986  Frank et al.
5,623,698 A    4/1997  Stephenson et al.
(Continued)

FOREIGN PATENT DOCUMENTS

JP      H02-271444      11/1990

Primary Examiner — Iqbal Zaidi
(74) Attorney, Agent, or Firm — Nicholson De Vos Webster & Elliott LLP (57) ABSTRACT Described embodiments process data packets received by a network switch coupled to an external buffering device. The network switch determines a queue of an internal buffer of the network switch associated with a flow of the received packet and determines whether the received packet should be forwarded to the external buffering device. If the received packet should be forwarded to the external buffering device, the network switch sets an external buffering active indicator indicating that the network switch is in an external buffering mode for the flow, tags the received packet with metadata, and forwards the packet to the external buffering device. The external buffering device stores the forwarded packet in a queue of a memory of the external buffering device corresponding to the tagged metadata of the forwarded packet. The network switch processes packets stored in the internal buffer of the network switch.

20 Claims, 6 Drawing Sheets

(56) References Cited

U.S. PATENT DOCUMENTS

| | | | |
|---|---|---|---|
| 5,892,766 A | 4/1999 | Wicki et al. | |
| 5,943,283 A | 8/1999 | Wong et al. | |
| 6,038,630 A | 3/2000 | Foster et al. | |
| 6,195,335 B1 | 2/2001 | Calvignac et al. | |
| 6,483,844 B1 * | 11/2002 | Erimli | H04L 12/44 370/386 |
| 6,487,212 B1 * | 11/2002 | Erimli | G06F 5/06 370/230 |
| 6,567,564 B1 | 5/2003 | van der Wal | |
| 6,636,932 B1 | 10/2003 | Regev et al. | |
| 7,079,539 B2 | 7/2006 | Calle et al. | |
| 7,089,346 B2 | 8/2006 | Cebulla et al. | |
| 7,234,018 B1 | 6/2007 | Purcell et al. | |
| 7,274,700 B2 | 9/2007 | Jin et al. | |
| 7,461,208 B1 | 12/2008 | Caprioli et al. | |
| 7,596,142 B1 | 9/2009 | MacAdam | |
| 2002/0029214 A1 | 3/2002 | Yianilos et al. | |
| 2002/0165985 A1 | 11/2002 | Chen et al. | |
| 2003/0033276 A1 | 2/2003 | Cheng et al. | |
| 2003/0123468 A1 | 7/2003 | Nong | |
| 2004/0255209 A1 | 12/2004 | Gross | |
| 2005/0027920 A1 | 2/2005 | Fitzsimmons et al. | |
| 2005/0152352 A1 | 7/2005 | Jun et al. | |
| 2006/0256783 A1 | 11/2006 | Ayrapetian et al. | |
| 2007/0011396 A1 | 1/2007 | Singh et al. | |
| 2007/0016756 A1 | 1/2007 | Hsieh et al. | |
| 2007/0226798 A1 | 9/2007 | Sibert | |
| 2008/0162793 A1 | 7/2008 | Chu et al. | |
| 2008/0240103 A1 | 10/2008 | Schmidt | |
| 2010/0020806 A1 | 1/2010 | Vahdat et al. | |
| 2010/0260198 A1 | 10/2010 | Rojas-Cessa et al. | |
| 2011/0064086 A1 * | 3/2011 | Xiong | H04L 49/351 370/401 |

* cited by examiner

NETWORK SWITCH WITH EXTERNAL BUFFERING VIA LOOPAROUND PATH

CROSS-REFERENCE TO RELATED APPLICATIONS

This application is a continuation-in-part, and claims the benefit of the filing date, of U.S. patent application Ser. No. 12/782,379 filed May 18, 2010, Ser. No. 12/782,393 filed May 18, 2010, now issued as U.S. Pat. No. 8,255,644, and Ser. No. 12/782,411 filed May 18, 2010, now issued as U.S. Pat. No. 8,407,707, the teachings of which are incorporated herein in their entireties by reference.

The subject matter of this application is related to U.S. patent application Ser. No. 12/430,438 filed Apr. 27, 2009, now issued as U.S. Pat. No. 8,352,669, Ser. No. 12/729,226 filed Mar. 22, 2010, Ser. No. 12/729,231 filed Mar. 22, 2010, now issued as U.S. Pat. No. 8,473,657, Ser. No. 12/963,895 filed Dec. 9, 2010, now issued as U.S. Pat. No. 8,499,137, Ser. No. 12/971,742 filed Dec. 17, 2010, Ser. No. 12/974,477 filed Dec. 21, 2010, Ser. No. 12/975,823 filed Dec. 22, 2010, now issued as U.S. Pat. No. 8,505,013, Ser. No. 12/975,880 filed Dec. 22, 2010, now issued as U.S. Pat. No. 8,514,874, Ser. No. 12/976,045 filed Dec. 22, 2010, Ser. No. 12/976,228 filed Dec. 22 2010, Ser. No. 12/979,551 filed Dec. 28, 2010, now issued as U.S. Pat. No. 8,489,791, Ser. No. 12/979,665 filed Dec. 28, 2010, now issued as U.S. Pat. No. 8,489,792, Ser. No. 12/979,800 filed Dec. 28,2010, now issued as U.S. Pat. No. 8,489,794, Ser. No. 13/046,717 filed Mar. 12, 2011, Ser. No. 13/046,719 filed Mar. 12, 2011, now issued as U.S. Pat. No. 8,321,385, Ser. No. 13/046,726 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, Ser. No. 13/359,690 filed Jan. 27, 2012, Ser. No. 13/405,053 filed Feb. 23, 2012, Ser. No. 13/403,468 filed Feb. 23, 2012, Ser. No. 13/409,432 filed Mar. 1, 2012, Ser. No. 13/474,114 filed May 17, 2012, Ser. No. 13/480,623 filed May 25, 2012, Ser. No. 13/568,365 filed Aug. 7, 2012, Ser. No. 13/687,719 filed Nov. 28, 2012, Ser. No. 13/687,772 filed Nov. 28, 2012, Ser. No. 13/687,865 filed Nov. 28, 2012, Ser. No. 13/687,911 filed Nov. 28, 2012, Ser. No. 13/687,971 filed Nov. 28, 2012, and Ser. No. 13/746,104 filed Jan. 21, 2013, the teachings of all of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators in a system on chip (SoC) architecture to offload certain tasks from the general-purpose processors, such as encryption/decryption, packet data inspections, and the like. These newer network processor designs are traditionally implemented with either i) a non-pipelined SoC architecture or ii) a fixed pipeline SoC architecture.

In a typical non-pipelined SoC architecture, general-purpose processors are responsible for each action taken by acceleration functions. A non-pipelined SoC architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline SoC architecture, packet data flows through the general-purpose processors and/or accelerators in a fixed sequence regardless of whether a particular processor or accelerator is required to process a given packet. For example, in a fixed sequence, a single accelerator within the fixed pipeline cannot be employed without employing the entire fixed pipeline. This fixed sequence might add significant overhead to packet processing and has limited flexibility to handle new protocols, limiting the advantage provided by using the accelerators.

Network processors are generally used for analyzing and processing packet data for routing and switching packets in a variety of applications, such as network surveillance, video transmission, protocol conversion, voice processing, and internet traffic routing. A network processor might employ a destination Media Access Control (MAC) address embedded in a packet generated by a source network device to transmit the packet to one or more appropriate target devices.

In mobile backhaul networks, typical Ethernet switch performance, capacity, cost, and power might typically be desired, but additional mobile backhaul packet processing features and traffic management capabilities might also be desired. Such additional mobile backhaul packet processing features and traffic management capabilities historically require network processors or similar devices that are generally physically larger, more costly and consume more power. Further, such network processors might not support full line rate processing. Further, Ethernet switches do not provide a large amount of packet buffering capacity. Large packet buffering capacity might be desired in mobile backhaul applications when microwave radio transmission facilities experience reduced transmission bandwidth (e.g., during inclement weather). In such applications, Ethernet switch-like devices do not have sufficient packet buffering capacity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments process data packets received by a network switch coupled to an external buffering device. The network switch determines a queue of an internal buffer of the network switch associated with a flow of the received packet and determines whether the received packet should be forwarded to the external buffering device. If the received packet should be forwarded to the external buffering device, the network switch sets an external buffering active indicator indicating that the network switch is in an external buffering mode for the flow, tags the received packet with metadata, and forwards the packet to the external buffering device. The external buffering device stores the forwarded packet in a queue of a memory of the external buffering device corresponding to the tagged metadata of the forwarded packet. The network switch processes packets stored in the internal buffer of the network switch.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

DETAILED DESCRIPTION

Described embodiments process data packets received by a network switch coupled to an external buffering device. The network switch determines a queue of an internal buffer of the network switch associated with a flow of the received packet and determines whether the received packet should be forwarded to the external buffering device. If the received packet should be forwarded to the external buffering device, the network switch sets an external buffering active indicator indicating that the network switch is in an external buffering mode for the flow, tags the received packet with metadata, and forwards the packet to the external buffering device. The external buffering device stores the forwarded packet in a queue of a memory of the external buffering device corresponding to the tagged metadata of the forwarded packet. The network switch processes packets stored in the internal buffer of the network switch.

Table 1 defines a list of acronyms employed throughout this specification as an aid to understanding the described embodiments:

TABLE 1

| ACL | Access Control List | AMBA | Advanced Microcontroller Bus Architecture |
|---|---|---|---|
| AXI | Advanced eXtensible Interface | COS | Class of Service |
| CPU | Central Processing Unit | CRC | Cyclic Redundancy Check |
| DDR | Double Data Rate | DMA | Direct Memory Access |
| DRAM | Dynamic Random Access Memory | ECC | Error Correction Code |
| FC | Fibre Channel | FIFO | First-In, First-Out |
| I/O | Input/Output | IP | Internet Protocol |
| JTAG | Joint Test Action Group | LRU | Least Recently Used |
| MAC | Media Access Control | µP | Microprocessor |
| MMB | Memory Manager Block | MPLS | Multi-Protocol Label Switching |

TABLE 1-continued

| MPP | Modular Packet Processor | MRU | Most Recently Used |
|---|---|---|---|
| MTM | Modular Traffic Manager | OSI | Open Systems Interconnection |
| NP | Network Processor | PAB | Packet Assembly Block |
| PCI-E | Peripheral Component Interconnect Express | PDU | Protocol Data Unit |
| PLB | Processor Local Bus | RF | Radio Frequency |
| SAS | Serial Attached SCSI | SATA | Serial Advanced Technology Attachment |
| SCH | Scheduler | SCSI | Small Computer System Interface |
| SED | Stream Editor | SLIP | Serial Line Internet Protocol |
| SoC | System-on-Chip | SPI | Serial Peripheral Interface |
| SPP | Security Protocol Processor | SRIO | Serial Rapid I/O |
| SWD | Serial Wire Debug | TCP | Transmission Control Protocol |
| UART | Universal Asynchronous Receiver/Transmitter | UDP | User Datagram Protocol |
| USB | Universal Serial Bus | VLAN | Virtual Local Area Network |

Figure 1:
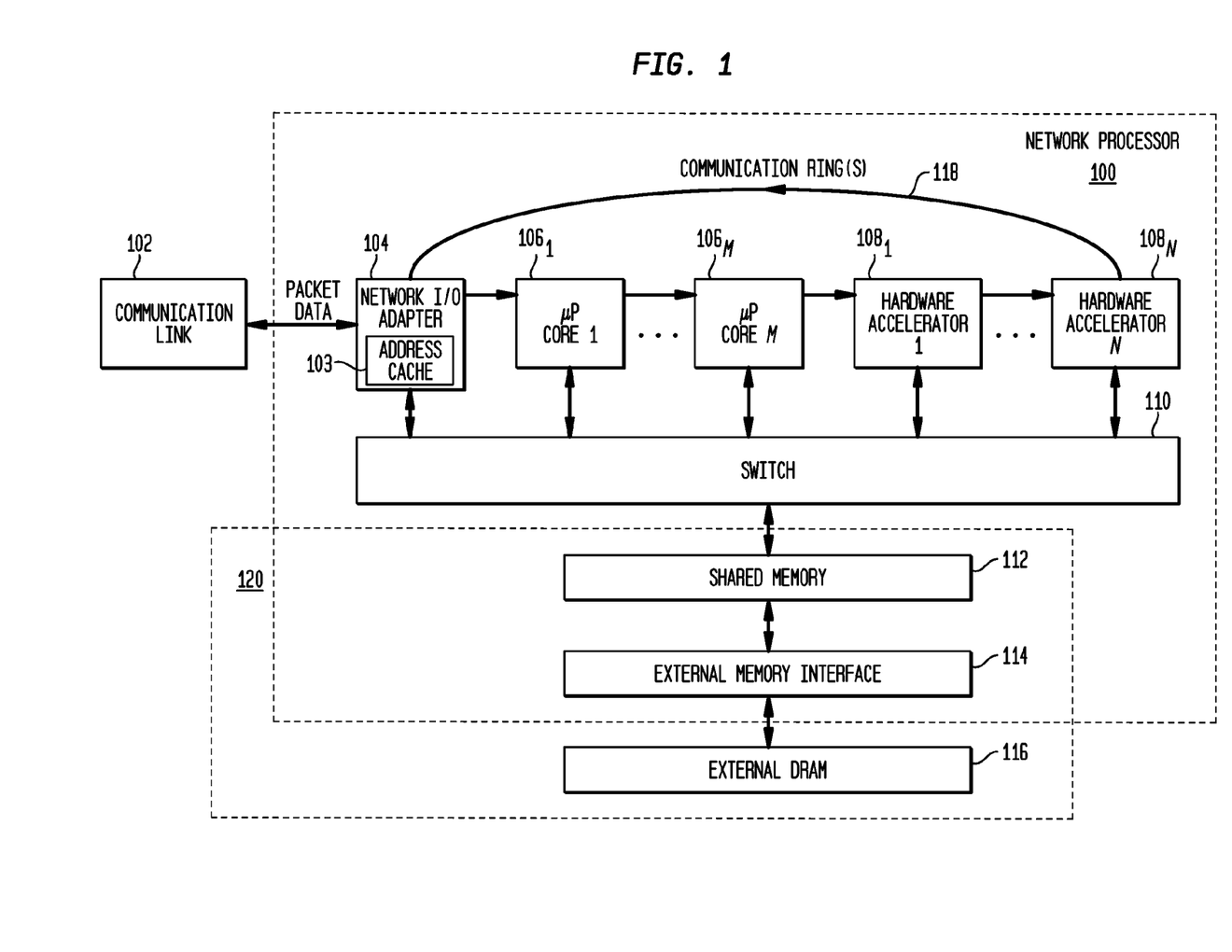
FIG. 1 shows a block diagram of a network processor operating in accordance with exemplary embodiments.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (µP) cores $106_1$-$106_M$, and one or more hardware accelerators $108_1$-$108_N$, where M and N are integers greater than or equal to 1. Network processor 100 also includes external memory interface 114 for communication with external memory 116. Shared memory 112 might be implemented as embedded dynamic random-access memory (eDRAM) internal to network processor 100. External memory 116 might typically be implemented as a double-data-rate (e.g., DDR-3) DRAM, for off-chip storage of data. In some embodiments, such as shown in FIG. 1, each of the one or more I/O interfaces, µP cores and hardware accelerators might be coupled through switch 110 to shared memory 112. Switch 110 might be implemented as a non-blocking crossbar switch such as described in related U.S. patent applications Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

Network I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In described embodiments, shared memory 112 is a conventional memory operating as a cache that might be allocated and/or subdivided. For example, shared memory 112 might include one or more FIFO queues that might be dynamically allocated to the various µP cores 106 and hardware accelerators 108. External memory interface 114 couples shared memory 112 to one or more external memories, shown as external memory 116, to provide off-chip storage of data not currently in use by the various µP cores 106 and hardware accelerators 108 to free space in shared memory 112. As indicated by the dashed line, shared memory 112 and external memory 116 might generally be referred to as system memory 120. In general, system memory 120 might be addressed as a single address space such that various accelerators 108 can seamlessly request data whether the data is stored in shared memory 112 or external memory 116.

Hardware accelerators 108 might interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In described embodiments, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent applications Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. Network I/O interface 104 might parse the received data packet and provide the received data packet, via switch 110, to a buffer in shared memory 112.

Network I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, network I/O interface 104 might be implemented as input (receive) only or output (transmit) only interfaces. As shown in FIG. 1, network I/O interface 104 might include address cache 103. Address cache 103 might be employed in performing media access control (MAC) address learning (e.g., to support the IEEE 802.1 standard (see sections 7.8 and 7.9 of 802.1D-2004) such as described in related U.S. patent application Ser. No. 13/705,822 filed Dec. 5, 2012 and incorporated by reference herein.

The various µP cores 106 and hardware accelerators 108 of network processor 100 might include several exemplary types of processors or accelerators. For example, the various µP cores 106 might be implemented as Pentium®, Power PC® or ARM processors or a combination of different processor types (Pentium® is a registered trademark of Intel Corporation, ARM processors are by ARM Holdings, plc, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250,898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can update task parameters.

The RegEx engine is a packet search engine for state-based cross-packet pattern matching. The RegEx engine is a multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010 and Ser. No. 13/359,690 filed Jan. 27, 2012, the teachings of which are incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. Nos. 12/971,742 filed Dec. 17, 2010, and Ser. No. 13/405,053 filed Feb. 23, 2012, the teachings of which are incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010 and Ser. No. 13/474,114 filed May 17, 2012, the teachings of which are incorporated by reference herein. The MPP might also include hash functionality such as described in related U.S. patent application Ser. Nos. 13/046,717, 13/046,719, and 13/046,726 all filed Mar. 12, 2011, Ser. No. 13/403,468 filed Feb. 23, 2012 and Ser. No. 13/474,114 filed May 17, 2012, the teachings of which are incorporated by reference herein.

Described embodiments of network processor 100 might employ a hardware-based mechanism as a front end to a software-based mechanism for a MAC learning table or bridging table to associate known MAC addresses with a given port. The hardware-based front-end (e.g., network I/O adapter 104) performs address learning and aging for the most frequently and recently used MAC addresses. The software-based mechanism performs address learning and aging for less frequently or less used MAC addresses using a higher-latency system memory compared to the hardware-based mechanism. Therefore, the software-based mechanism is only accessed for a relatively small percentage of address look-ups that are not accommodated by the hardware-based memory. Such embodiments are described in related to U.S. patent application Ser. No. 13/705,822 filed Dec. 5, 2012, the teachings of which are incorporated herein by reference.

Figure 2:
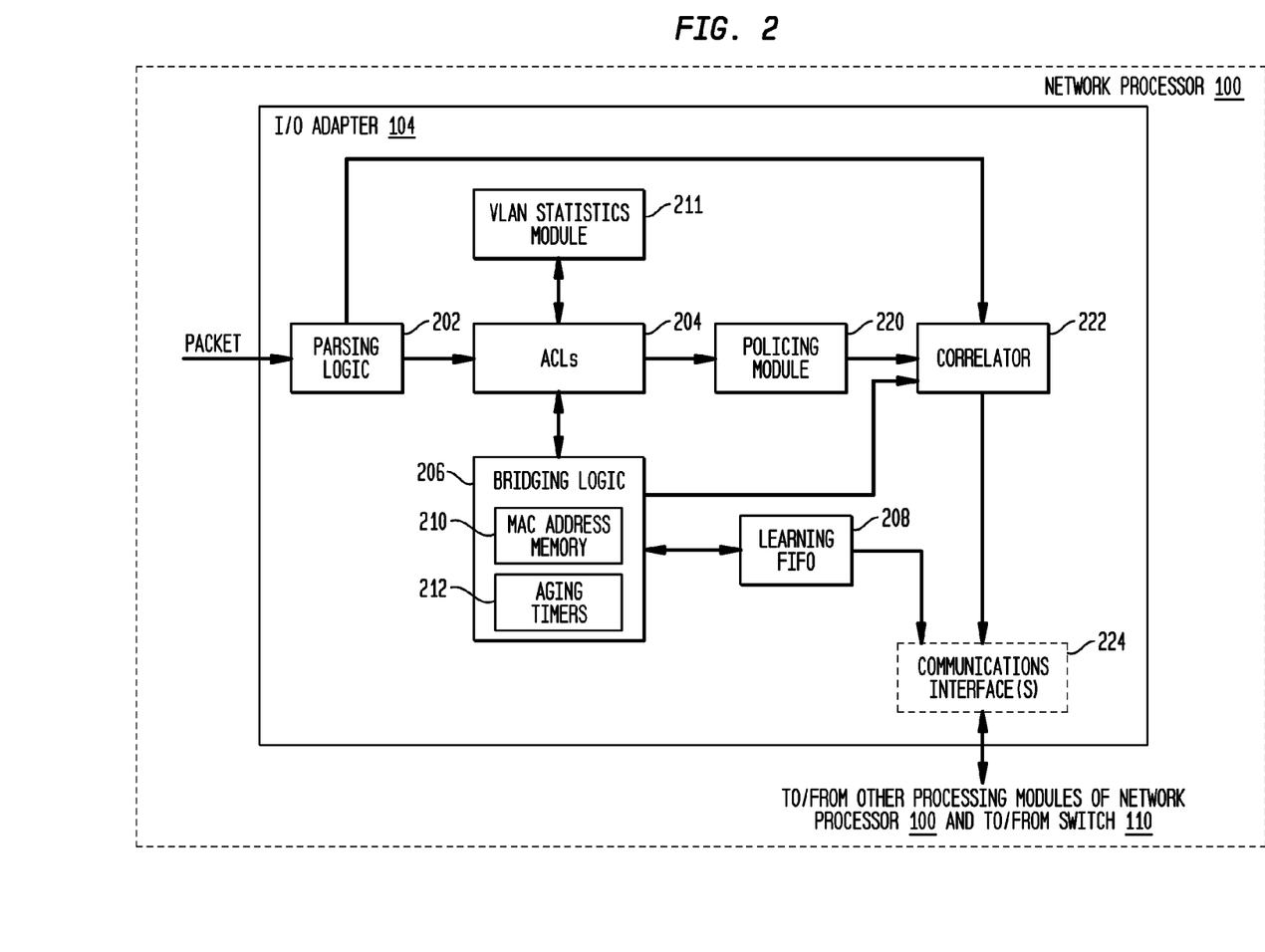
FIG. 2 shows an exemplary block diagram of an I/O adapter of the network processor of FIG. 1.

FIG. 2 shows a block diagram of network I/O adapter 104. As described herein, network I/O adapter 104 might be at least one of a SCSI protocol bus, a SAS protocol bus, a SATA protocol bus, a USB bus, an Ethernet link, an IEEE 802.11 link, an IEEE 802.15 link, an IEEE 802.16 link, a PCI-E link, an SRIO, or other similar interfaces. In some embodiments, network I/O adapter 104 might also include one or more debug interfaces for interfacing with, for example, development tools of users of network processor 100, such as a debugger operating in compliance with a Joint Test Action Group (JTAG) interface, a Serial Wire Debug (SWD) interface, or miscellaneous interfaces such as Serial Peripheral Interface (SPI), a Serial Line Internet Protocol (SLIP) interface or a Universal Asynchronous Receiver/Transmitter (UART) such as described in related U.S. patent application Ser. No. 13/274,726 filed Oct. 17, 2011.

Parsing logic 202 extracts various data fields from received packets. For example, parsing logic 202 might extract OSI Layer 2, Layer 3 or Layer 4 fields from the received packet, such as MAC addresses, MPLS addresses, IP addresses, or TCP/UDP port addresses. Parsing logic 202 might also perform some verification of the received packet, such as verifying a CRC value or IPv4 checksum, or verifying that the packet is properly formed. Depending on the extracted data, parsing logic 202 might also perform special processing for a received packet. For example, parsing logic 202 might detect Ethernet Synchronization Messaging Channel (ESMC) packets and provide them to a specialized data flow of network processor 100. Some specialized packets might be provided to a non-classified packet processing module (not shown), which might generate and enqueue a task for processing within network processor 100 without further processing by network I/O adapter 104. For example, Ethernet "pause" packets, Ethernet "runt" packets, and ESMC packets might be provided to the non-classified packet processing module.

As shown in FIG. 2, network I/O adapter 104 might also have one or more communications interfaces with various modules of network processor 100, shown as other interfaces 224. For example, network I/O adapter 104 receives tasks from other processing modules of network processor 100, the tasks corresponding to packets for transmission onto the network (e.g., via communication link 102). Tasks received might provide address(es) in system memory 120 of packet data to be transmitted.

Typical received packets might be provided to access control lists (ACLs) module 204 and might perform bridging, policing, and correlation for received packets. For example, ACL module 204 includes one or more bridging lists (not shown) for destination addresses corresponding to a received packet. Each list in ACL module 204 includes one or more rules based on, for example, a VLAN corresponding to the packet and a port corresponding to the packet. ACL module 204 might also check rate limits for corresponding VLANs and ports. Bridging logic module 206 determines where to transmit the data packet and typically implements address learning and aging. Bridging logic module 206 controls learning through use of MAC address table 210 and aging timers 212. When hardware learning or aging occurs, bridging logic module 206 sends a task to learning FIFO 208, which in turn sends the task to the task ring (e.g., one of rings 118) via communications interface(s) 224. If FIFO 208 backs up, bridging logic module 206 ceases to learn new addresses and ages out old addresses, thus ensuring the addresses stored in different memories of network processor 100 remain synchronized.

VLAN statistics module 211 might maintain one or more statistics for various virtual local area networks of network processor 100. Such statistics might include a number of packets transmitted, a number of bytes transmitted, a number of packets received, and a number of bytes received for each VLAN of network processor 100. VLAN statistics module 211 receives inputs from ACL module 204 corresponding to packets transmitted and received by network processor 100 to track one or more statistics of each transmitted and received packet. VLAN statistics module 211 might operate substantially as described in related U.S. patent application Ser. No. 13/310,961 filed Dec. 5, 2011.

Most Ethernet switches use on-chip memory for packet buffering. Certain applications might experience reduced transmission bandwidth at certain times, for example, mobile backhaul applications employing using microwave radio facilities might experience reduced transmission bandwidth during inclement weather. Described embodiments provide a looparound path that connects the switch to a buffering device to provide buffering, when required, for a subset of the traffic. In general, the portion of traffic that needs to be buffered is often half or less of the total switching capacity.

Figure 3:
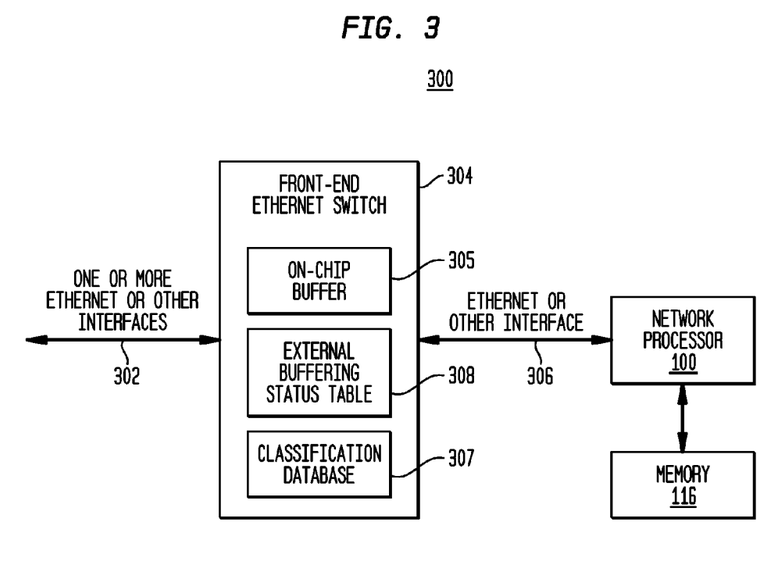
FIG. 3 shows an exemplary Ethernet switch system employing the network processor of FIG. 1.

FIG. 3 shows exemplary system 300 employing network processor 100 and front-end Ethernet switch 304. Packets arrive in the system via external Ethernet links (shown as 302) on Ethernet switch 304. In some embodiments, Ethernet switch 304 might classify received packets based on limited information dynamically stored in database 307 such as described in related U.S. patent application Ser. No. 13/746,104, filed on common date herewith having, included by reference herein.

In described embodiments, Ethernet switch 304 buffers received packets in on-chip buffer 305. However, in typical Ethernet switches, on-chip buffer 305 is typically small, limiting the buffering capacity of the Ethernet switch. Described embodiments monitor packet data occupancy of on-chip buffer 305 and, when the data occupancy reaches a threshold, sets Ethernet switch 304 to forward packets to port(s) corresponding to network processor 100, which typically has much greater buffering capacity (e.g., memory 116) than Ethernet switch 304. Although shown in FIG. 3 as being connected to switch 304 via an Ethernet connection or a link aggregation group of Ethernet interfaces (e.g., via otherwise unused switch ports on the switch core), other embodiments might employ interface(s) other than an Ethernet interface, and some embodiments might integrate network processor 100 into the same silicon die or package as the switch core of switch 304.

In described embodiments, when packet data occupancy in buffer 305 reaches or exceeds a threshold for a queue for which external packet buffering is enabled/allowed, switch 304 directs subsequent packets destined to that queue to network processor 100 for external buffering. For example, switch 304 might maintain a table of queue IDs and a corresponding state indicating for which queues external packet buffering is enabled. In some embodiments this table is stored within external buffering status table 308. Which queues have external buffering enabled might be set by a control processor (e.g., one of µP cores 106) of network processor 100. Further, switch 304 might maintain a state within the table indicating which queues are actively in external packet buffering mode. Switch 304 tags each packet with an indication of its corresponding queue. Network processor 100 reads the tag to store each forwarded packet in an associated queue (e.g., in memory 116). In described embodiments, the packet tags might be implemented as metadata in virtual pipeline task parameters of network processor 100 (e.g., if network processor 100 is implemented on the same SoC as switch 304) or as a specialized header field of the packet (e.g., in a header identified by a special EtherType in an Ethernet packet) if the packet is sent over a communication link from switch 304 to network processor 100. Each tag might include a sequence number or a timestamp for tracking packet ordering for each queue. For each queue, switch 304 records the last sequence number or timestamp forwarded to network processor 100 for external buffering such that traffic buffering can be switched back to switch 304 without misordering packets. Network processor 100 stores the forwarded packets and their timestamp or sequence ID (e.g., in memory 116) until packet data occupancy in buffer 305 reaches or falls below another threshold for a corresponding queue.

Once packet data occupancy in buffer 305 reaches or falls below another threshold for the queue for which external packet buffering is enabled, switch 304 requests packets from network processor 100 for the corresponding queue such to be enqueued in on-chip buffer 305. During this time, switch 304 still sends newly arriving packets for the queue to network processor 100 for external buffering to avoid misordering any packets. When the sequence number or timestamp of a packet sent back from network processor 100 to switch 304 matches the sequence number or timestamp of the last packet that switch 304 sent to network processor 100 for external buffering for a given queue, switch 304 then stops forwarding packets for that queue to network processor 100 for external buffering. At any subsequent time, if the packet data occupancy in buffer 305 reaches or exceeds the congestion threshold, switch 304 restarts forwarding packets to network processor 100 for external buffering.

Figure 4:
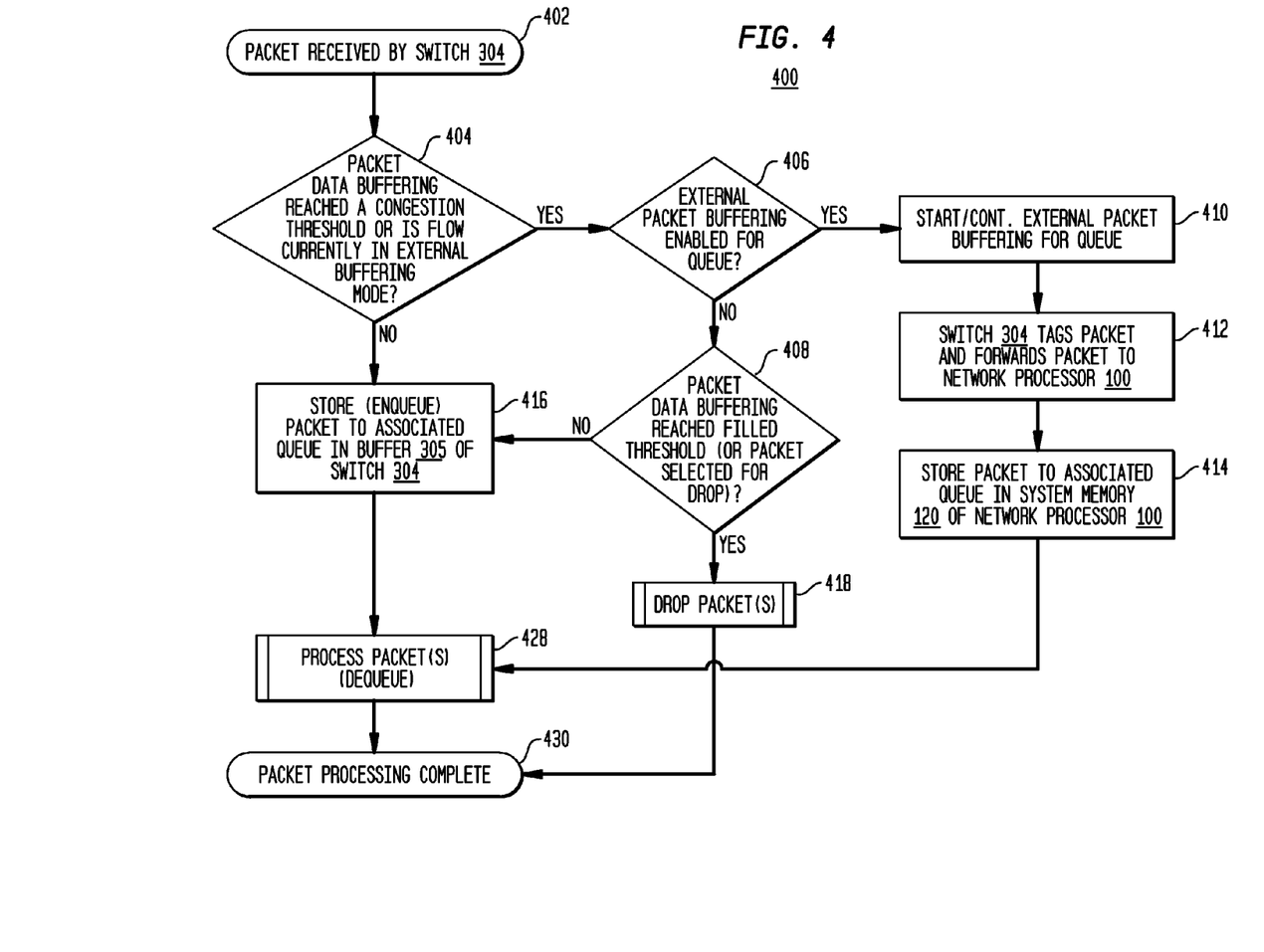
FIG. 4 shows a flow diagram of a packet processing algorithm of the system of FIG. 3 in accordance with exemplary embodiments.

FIG. 4 shows a flow diagram of packet processing algorithm 400 employed by system 300 of FIG. 3. At step 402, a packet is received by switch 304 (e.g., from link 302). At step 404, switch 304 determines if packets for the flow corresponding to the received packet are already being forwarded to network processor 100 for external buffering such that the received packet should be forwarded to network processor 100. For example, switch 304 might check external buffering status table 308 to determine if the queue is actively in external buffering mode. Also at step 404, if packets for the flow corresponding to the received packet are not already being forwarded to network processor 100 for external buffering, switch 304 determines whether packet data occupancy in buffer 305 has reached a congestion threshold such that external buffering should be started. In some embodiments, the congestion threshold might be a predetermined percentage of the size of buffer 305. For example, the congestion threshold might be selected as a percentage of the overall size of buffer 305 such that buffer 305 does not become full before received packets can be externally buffered by network processor 100.

At step 404, if packets for the flow corresponding to the received packet are already being forwarded to network processor 100 for external buffering or the congestion threshold has been reached, then at step 406 switch 304 determines whether external packet buffering is enabled for the queue corresponding to the flow of the received packet. For example, switch 304 might check external buffering status table 308 to determine if external buffering is enabled for the queue. If, at step 406, external packet buffering for the queue is enabled, then at step 410 external buffering for the queue is started (or continued, if, at step 404, packets for the flow corresponding to the received packet are already being forwarded to network processor 100 for external buffering). For example, at step 410, switch 304 might set a state in external buffering status table 308 to indicate that the queue is actively in external buffering mode. At step 412, switch 304 tags the packet and sends the packet to network processor 100 for external buffering (e.g., in memory 116). As described, the packet tags might be implemented as metadata for virtual pipeline task parameters of network processor 100. Each tag might include a sequence number or a timestamp for tracking packet ordering for each queue. At step 414, network processor 100 stores the packet data and tag data to an associated queue in the network processor memory (e.g., system memory 120, which includes internal memory 112 and external memory 116). Queues of network processor 100 might be associated with queues of switch 304 by mapping queue addresses of buffer 305 to queue addresses in memory 120 (e.g., by shifting the queue addresses by a constant value or by a translation table maintained by network processor 100). At step 428, switch 304 and network processor 100 process ("dequeue") the queued packets stored in buffer 305 and network processor memory 120. Step 428 is described in greater detail in regard to FIG. 5. Packet processing algorithm 400 completes at step 430.

If, at step 406, external packet buffering is not enabled for the queue corresponding to the flow of the received packet, then, at step 408, switch 304 determines whether the queue corresponding to the flow of the received packet (e.g., a queue in buffer 305) has reached a filled threshold such that the packet cannot be stored in buffer 305, or whether the packet is selected to be dropped based on some other criteria (e.g., access control list rules might have already indicated a packet to be dropped earlier in the processing pipeline of switch 304). In some embodiments, the filled threshold might be a higher percentage of the overall size of buffer 305 than the congested threshold. In some embodiments, the filled threshold might be a random early detection threshold to drop packets such as described in related U.S. patent application Ser. No. 13/250,883 filed Sep. 30, 2011 and incorporated by reference herein. If, at step 408, the corresponding queue has reached the filled threshold or the packet is otherwise selected to be dropped, switch 304 drops the packet at step 418. At step 428, switch 304 and network processor 100 process ("dequeue") the queued packets stored in buffer 305 and network processor memory 120. Step 428 is described in greater detail in regard to FIG. 5. Packet processing algorithm 400 completes at step 430.

At step 404, if packets for the flow corresponding to the received packet are not already being forwarded to network processor 100 for external buffering or the congestion threshold has not been reached, then at step 416 switch 304 stores ("enqueues") the packet to an associated queue in buffer 305 of switch 304. At step 428, switch 304 processes ("dequeues") the queued packets stored in buffer 305. Step 428 is described in greater detail in regard to FIG. 5. Packet processing algorithm 400 completes at step 430.

Figure 5:
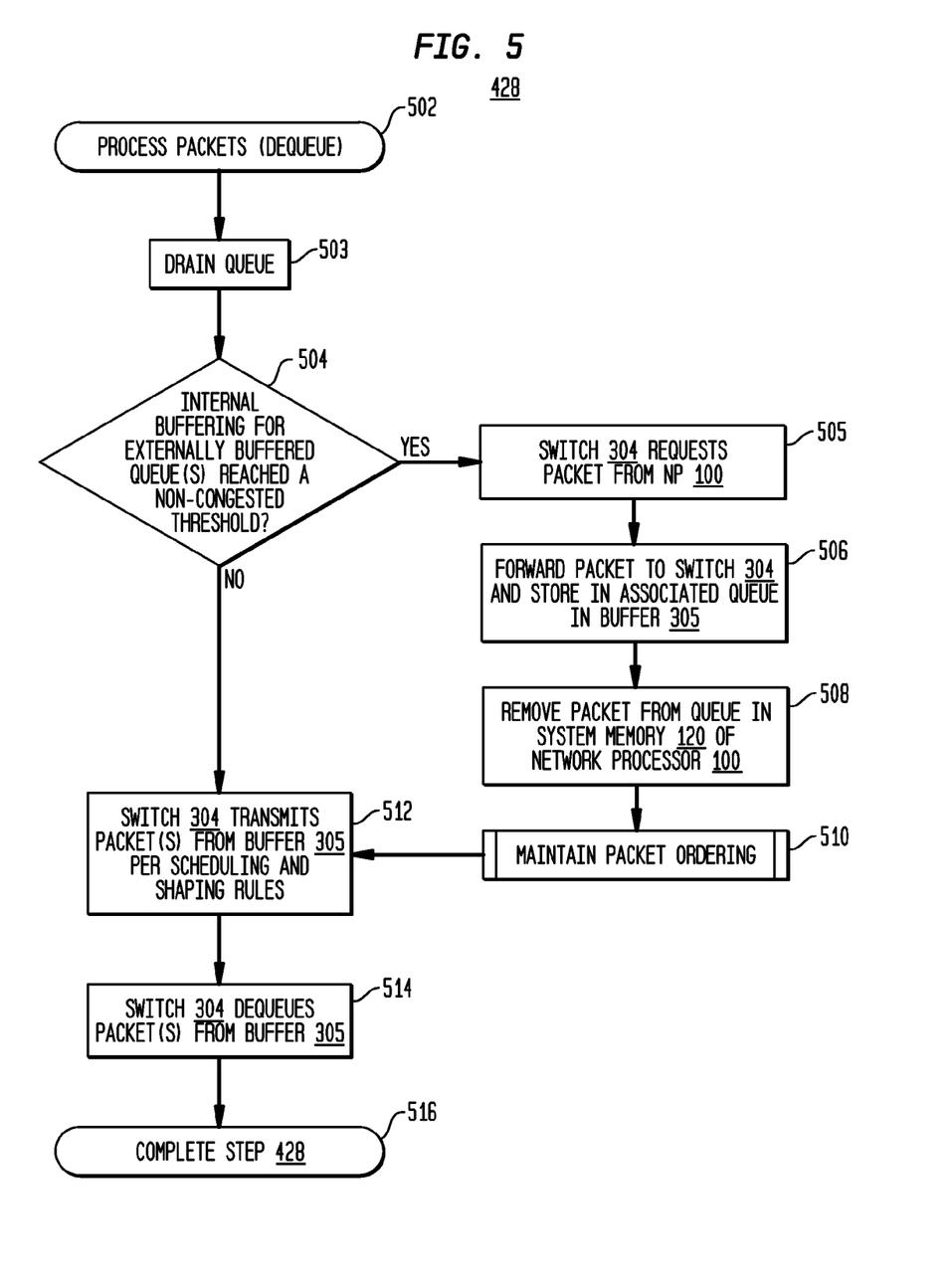
FIG. 5 shows a flow diagram of a packet dequeue sub-process of the packet processing algorithm of FIG. 4 in accordance with exemplary embodiments.

FIG. 5 shows a flow diagram of packet dequeue process 428 of FIG. 4. At step 502, dequeue process 428 starts. At step 503, a corresponding queue of buffer 305 is selected and a packet is drained, or removed from the queue and prepared for transmission to one or more destination addresses, by switch 304. In some embodiments, switch 304 might select one queue from the plurality of queues to be drained based on a deficit weighted round robin (DWRR) or any other scheduling algorithm. At step 504, if removing the packet from the queue of buffer 305 causes the corresponding queue to reach a non-congested threshold, and the queue is actively in external buffering mode, then process 428 proceeds to step 505. In some embodiments, the non-congested threshold might be selected such that the output link of switch 304 does not go idle by draining every packet stored in buffer 305 before externally buffered packets can be sent from network processor 100. Further, the non-congested threshold might be selected such that buffer 305 has enough free space to store the entire requested number of packets to be forwarded from external buffering by network processor 100. In some embodiments, if buffer 305 reaches the filled threshold while accepting packets from network processor 100, switch 304 might send a request to network processor 100 to stop forwarding packets and request that network processor 100 maintain the packet data as externally buffered data. At step 505, since the corresponding queue is no longer congested, switch 304 requests one or more externally buffered packets associated with the queue from network processor 100. At step 506, network processor 100 forwards a next packet for the corresponding queue, and the tag data corresponding to the packet, to switch 304. Switch 304 receives the packet and tag data, which is stored in the associated queue in buffer 305. At step 508, network processor 100 removes the packet and tag data from the queue in system memory 120 of the network processor, since the packet has been forwarded from the external buffer to switch 304. At step 510, packet ordering is maintained between switch 304 and network processor 100 based on the tag data. Step 510 is described in greater detail in regard to FIG. 6. After step 510, process 428 proceeds to step 512.

At step 504, if removing the packet from the queue does not cause the corresponding queue to reach a non-congestion threshold, or the queue is not in external buffering mode, then process 428 proceeds to step 512.

At step 512, switch 304 transmits one or more selected packets from buffer 305, based on selected scheduling and traffic shaping rules of switch 304, to one or more corresponding destination addresses. Typical scheduling and traffic shaping algorithms control the quality of service (QoS) for a given type of traffic, the volume of traffic sent in a specified period (e.g., bandwidth throttling), the maximum rate at which traffic is sent (e.g., rate limiting), among other factors. At step 514, switch 304 removes the corresponding packet data from buffer 305. Process 428 completes at step 516.

Figure 6:
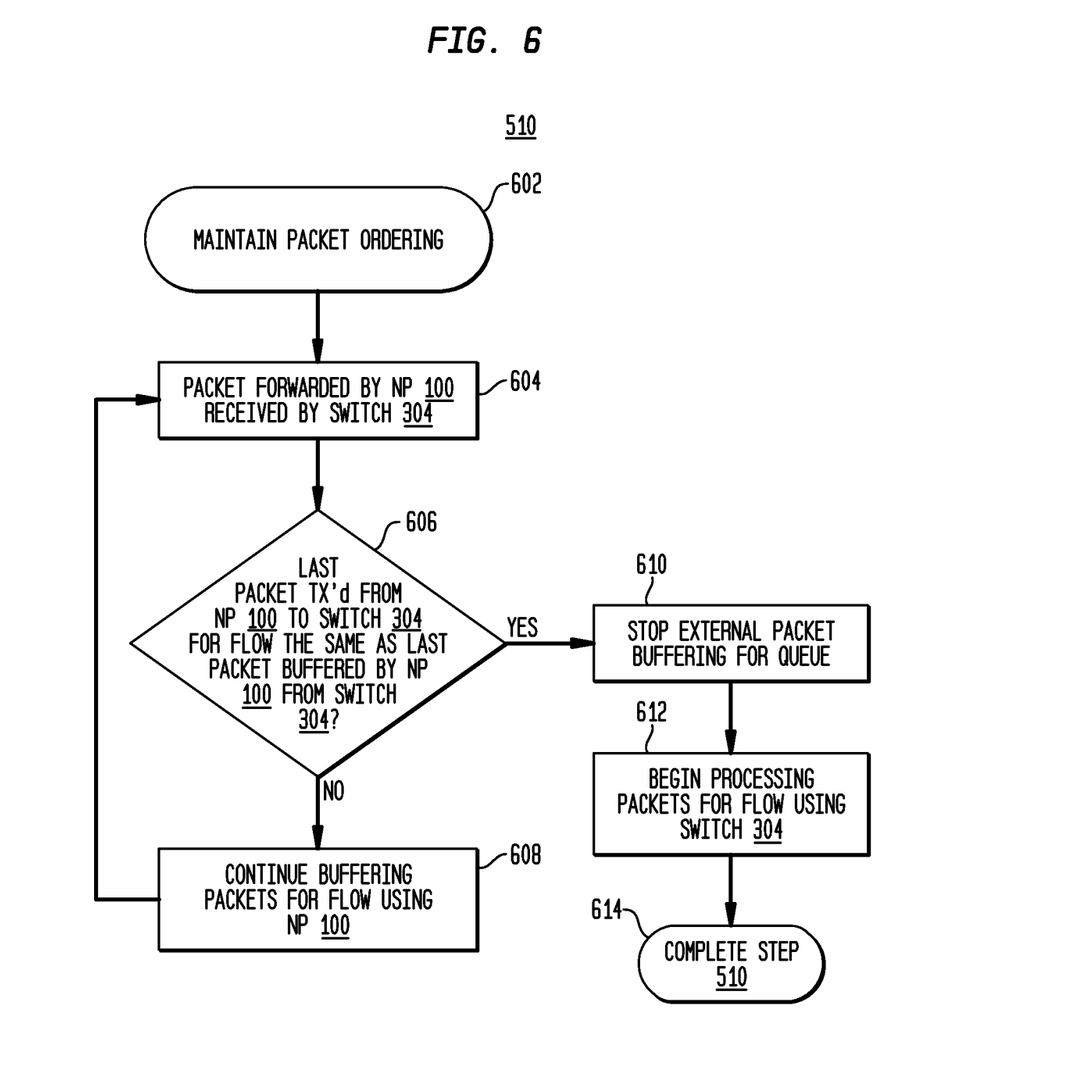
FIG. 6 shows a packet ordering sub-process of the packet processing algorithm of FIG. 4 in accordance with exemplary embodiments.

FIG. 6 shows a flow diagram of packet ordering process 510 of FIG. 5. At step 602, packet ordering process 510 starts. At step 604, the packet data and tag data forwarded by network processor 100 at step 506 is received by switch 304 and stored in an associated queue of buffer 305. At step 606, switch 304 determines if the tag data (e.g., the timestamp and/or sequence number) of the most recently received packet from network processor 100 for a given flow matches the tag data (e.g., the timestamp and/or sequence number) of the last packet forwarded to network processor 100 for external buffering for the given flow. If, at step 606, the tag data for the most recently received packet for a flow matches the tag data of the last packet externally buffered for the flow, then, at step 610, switch 304 determines that there are no packets for the flow in-flight between switch 304 and network processor 100, such that packet ordering of externally buffered packets for the flow has been maintained with more recently received packets. At step 610, switch 304 stops externally buffering packets for the queue of buffer 305 associated with the flow. For example, switch 304 might set a state in external buffering status table 308 to indicate that the queue is not actively in external buffering mode. At step 612, packets for the flow are processed by switch 304 from the associated queue of buffer 305 (e.g., by draining the queue and transmitting packets to one or more corresponding destination addresses). At step 614, packet ordering process 510 completes for the flow.

If, at step 606, the tag data for the most recently received packet for a flow does not match the tag data of the last packet externally buffered for the flow, then, at step 606, switch 304 determines that there are packets for the flow in-flight between switch 304 and network processor 100, such that packets for the flow are still externally buffered by network processor 100. At step 608, switch 304 continues externally buffering packets for the queue of buffer 305 associated with the flow. For example, switch 304 might set a state in external buffering status table 308 to indicate that the queue is not actively in external buffering mode. Process 510 returns to step 604 as subsequent packets for the flow are forwarded from network processor 100 to switch 304, and the tag data of each subsequent packet is checked until at step 606, the tag data for the most recently received packet for a flow matches the tag data of the last packet externally buffered for the flow, then, at step 610, switch 304 determines that there are no packets for the flow in-flight between switch 304 and network processor 100, such that packet ordering of externally buffered packets for the flow has been maintained with more recently received packets. At step 610, switch 304 stops externally buffering packets for the queue of buffer 305 associated with the flow. At step 612, packets for the flow are processed by switch 304 from the associated queue of buffer 305 (e.g., by draining the queue and transmitting packets to one or more corresponding destination addresses). At step 614, packet ordering process 510 completes for the flow.

Thus, as described herein, described embodiments process data packets received by a network switch coupled to an external buffering device. The network switch determines a queue of an internal buffer of the network switch associated with a flow of the received packet and determines whether the received packet should be forwarded to the external buffering device. If the received packet should be forwarded to the external buffering device, the network switch sets an external buffering active indicator indicating that the network switch is in an external buffering mode for the flow, tags the received packet with metadata, and forwards the packet to the external buffering device. The external buffering device stores the forwarded packet in a queue of a memory of the external buffering device corresponding to the tagged metadata of the forwarded packet. The network switch processes packets stored in the internal buffer of the network switch.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments have been described with respect to processing blocks in a software program, including possible implementation as a digital signal processor, micro-controller, or general-purpose computer, described embodiments are not so limited. As would be apparent to one skilled in the art, various functions of software might also be implemented as processes of circuits. Such circuits might be employed in, for example, a single integrated circuit, a multi-chip module, a single card, or a multi-card circuit pack.

Described embodiments might also be embodied in the form of methods and apparatuses for practicing those methods. Described embodiments might also be embodied in the form of program code embodied in non-transitory tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing described embodiments. Described embodiments might can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the described embodiments. When implemented on a general-purpose processor, the program code segments combine with the processor to provide a unique device that operates analogously to specific logic circuits. Described embodiments might also be embodied in the form of a bitstream or other sequence of signal values electrically or optically transmitted through a medium, stored magnetic-field variations in a magnetic recording medium, etc., generated using a method and/or an apparatus of the described embodiments.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various described embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. Unless explicitly stated otherwise, each numerical value and range should be interpreted as being approximate as if the word "about" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of the described embodiments might be made by those skilled in the art without departing from the scope expressed in the following claims.

I claim:

1. A method of processing data packets received by a network switch coupled to an external buffering device, the method comprising:
   determining, by the network switch, an associated queue of an internal buffer of the network switch, wherein the queue is associated with a flow of the received packet;
   determining, by the network switch, whether the received packet should be forwarded to the external buffering device;
   when the received packet should be forwarded to the external buffering device:
      setting, by the network switch, an external buffering active indicator corresponding to the flow of the received packet indicating that the network switch is in an external buffering mode for the flow;
      tagging, by the network switch, the received packet with metadata including a queue indicator and a timestamp;
      forwarding, by the network switch, the packet to the external buffering device; and
      storing, by the external buffering device, the forwarded packet in a queue of a memory of the external buffering device by timestamp order, the queue corresponding to the queue indicator of the forwarded packet; and
   processing, by the network switch, packets stored in the internal buffer of the network switch.

2. The method of claim 1, wherein the determining, by the network switch, whether a received packet should be forwarded to the external buffering device comprises:
   determining, by the network switch:
      (i) whether the external buffering active indicator corresponding to the flow of the received packet is set; and
      (ii) whether an amount of data stored in the associated queue of the internal buffer has reached a congestion threshold;
   if at least one of: (i) the external buffering active indicator corresponding to the flow of the received packet is set, and (ii) the amount of data stored in the associated queue of the internal buffer has reached the congestion threshold:
      determining, by the network switch, whether external packet buffering is enabled for the associated queue, and, if so, determining that the received packet should be forwarded to the external buffering device.

3. The method of claim 2, wherein, if external packet buffering is disabled for the associated queue, the method further comprises:
   determining, by the network switch:
      (i) whether the received packet is selected for dropping; and
      (ii) whether an amount of data stored in the associated queue of the internal buffer has reached a filled threshold;
   if at least one of: (i) whether the received packet is selected for dropping, and (ii) the amount of data stored in the associated queue of the internal buffer has reached the filled threshold:
      dropping, by the network switch, the received packet.

4. The method of claim 3, wherein the congested threshold is a first percentage of an overall size of the internal buffer of the network switch, wherein the first percentage is selected such that the internal buffer does not become full before the network switch is in the external buffering mode for the flow.

5. The method of claim 4, wherein the filled threshold is a second percentage of the overall size of the internal buffer of the network switch, the second percentage higher than the first percentage.

6. The method of claim 2, wherein the processing, by the network switch, packets stored in the internal buffer of the network switch comprises:
   draining a packet from a selected queue of the internal buffer of the network switch;
   if the external buffering active indicator corresponding to the selected queue is set:
      determining whether an amount of data stored in the selected queue has reached a non-congested threshold, and if so:
         requesting, by the network switch, a packet corresponding to the selected queue from the external buffering device;
         forwarding, by the external buffering device, the requested packet and corresponding tagged metadata to the network switch;
         storing, by the network switch, the forwarded packet and corresponding tagged metadata to the selected queue in the internal buffer of the network switch;
         removing, by the external buffering device, the forwarded packet and corresponding tagged metadata from the memory of the external buffering device; and
         maintaining, by the network switch, packet ordering based on the corresponding tagged metadata;
      transmitting the packet to one or more corresponding destination addresses; and
      removing, by the network switch, the transmitted packet and corresponding tagged metadata from the internal buffer of the network switch.

7. The method of claim 6, wherein the metadata comprises at least one of a timestamp and a packet sequence number of the flow.

8. The method of claim 7, wherein the maintaining, by the network switch, packet ordering based on the corresponding tagged metadata comprises:
   determining, by the network switch, whether the tagged metadata of the forwarded packet matches metadata of a last packet of the corresponding flow forwarded by the network switch to the external buffering device and, if so:
      clearing, by the network switch, the external buffering active indicator corresponding to the flow, indicating that the network switch is not in the external buffering mode for the flow; and
      buffering subsequently received packets corresponding to the flow in the internal buffer of the network switch; otherwise:

maintaining external buffering mode for subsequently received packets corresponding to the flow.

9. The method of claim 6, wherein the non-congested threshold is a percentage of the overall size of the internal buffer of the network switch, the non-congested threshold selected such that the internal buffer does not drain every packet before the requested externally buffered packet is forwarded by the external buffering device.

10. The method of claim 9, wherein the non-congested threshold is selected such that the internal buffer has enough free space to store the packet forwarded by the external buffering device.

11. The method of claim 6, wherein the queue is selected based on at least one of: (i) scheduling rules and (ii) traffic shaping rules.

12. The method of claim 2, wherein the determining, by the network switch, whether external packet buffering is enabled for the associated queue comprises:
checking an external buffering enabled indicator corresponding to the queue,
wherein the external buffering enabled indicator and the external buffering active indicator are stored in an external buffering status table of the network switch.

13. The method of claim 12, further comprising:
determining, by a control processor of the external buffering device, a setting for the external buffering enabled indicator corresponding to each queue.

14. The method of claim 1, wherein if the network switch determines that the received packet should not be forwarded to the external buffering device, the method further comprises:
storing the received packet in the queue of the internal buffer of the network switch associated with the flow of the received packet.

15. The method of claim 1, wherein:
the network switch is an Ethernet switch; and
the external buffering device comprises a network processor having a plurality of processing modules and at least one shared memory comprising one or more queues.

16. The method of claim 15, wherein the one or more queues of the at least one shared memory of the network processor are each associated with a corresponding one of the queues of the internal buffer of the network switch by mapping queue addresses of the internal buffer to queue addresses in the at least one shared memory of the network processor.

17. The method of claim 1, wherein the method is implemented by a machine executing program code encoded on a non-transitory machine-readable storage medium.

18. A network system comprising:
a network switch comprising an internal buffer, a classification database and an external buffering status table, the network switch coupled to a network and configured to transfer packets between the internal buffer and one or more remote devices coupled to the network;
an external buffering device coupled to the network switch, the external buffering device comprising a network processor having a plurality of processing modules and at least one shared memory comprising one or more queues;
wherein the network switch is configured to:
determine an associated queue of an internal buffer of the network switch, wherein the queue is associated with a flow of the received packet;
determine whether the received packet should be forwarded to the external buffering device;
when the received packet should be forwarded to the external buffering device:
set an external buffering active indicator corresponding to the flow of the received packet indicating that the network switch is in an external buffering mode for the flow;
tag the received packet with metadata including a queue indicator and a timestamp; and forward the packet to the external buffering device;
wherein the external buffering device is configured to:
store the forwarded packet in a queue of the at least one shared memory of the external buffering device by timestamp, the queue corresponding to the queue indicator of the forwarded packet; and
wherein the network switch is configured to process packets stored in the internal buffer of the network switch.

19. The system of claim 18, wherein the network switch is further configured to:
determine (i) whether the external buffering active indicator corresponding to the flow of the received packet is set; and (ii) whether an amount of data stored in the associated queue of the internal buffer has reached a congestion threshold;
if at least one of: (i) the external buffering active indicator corresponding to the flow of the received packet is set, and (ii) the amount of data stored in the associated queue of the internal buffer has reached the congestion threshold, the network switch is configured to determine whether external packet buffering is enabled for the associated queue, and, if so, determining that the received packet should be forwarded to the external buffering device.

20. The system of claim 19, wherein:
if external packet buffering is disabled for the associated queue, the network switch is further configured to determine (i) whether the received packet is selected for dropping; and (ii) whether an amount of data stored in the associated queue of the internal buffer has reached a filled threshold;
if at least one of: (i) whether the received packet is selected for dropping, and (ii) the amount of data stored in the associated queue of the internal buffer has reached the filled threshold, the network switch is configured to drop the received packet.

* * * * *